United States Patent [19]
Pavone

[11] Patent Number: 5,916,115
[45] Date of Patent: Jun. 29, 1999

[54] OLIVE PICKER

[76] Inventor: Osvaldo Pavone, 112 Valera Dr., Stoney Creek Ontario, Canada, L8E 4T6

[21] Appl. No.: 08/932,046

[22] Filed: Sep. 17, 1997

[51] Int. Cl.$^6$ ..................................................... A01D 46/00
[52] U.S. Cl. ............................... 56/328.1; 56/330; 56/332
[58] Field of Search ............................... 56/328.1, 327.1, 56/329, 330, 331, 340.1, 332, 333, 337

[56] References Cited

U.S. PATENT DOCUMENTS

| | | |
|---|---|---|
| 1,585,080 | 5/1926 | Caldwell . |
| 3,522,697 | 8/1970 | Shaff . |
| 3,651,627 | 3/1972 | Pitti . |
| 3,813,860 | 6/1974 | Cecchi . |
| 3,864,899 | 2/1975 | Lasswell ................................ 56/328.1 |
| 4,222,219 | 9/1980 | Lasswell . |
| 4,538,405 | 9/1985 | Alexandrino . |
| 4,611,461 | 9/1986 | Tyros . |
| 5,099,637 | 3/1992 | Drusiani . |
| 5,437,146 | 8/1995 | Erickson . |

OTHER PUBLICATIONS

Pick–Machine Mod. Olivella Brochure (Date Unknown).
La Novita'Nella Raccolta Meccanica Dell Olive Oli–Picker (Date Unknown).

*Primary Examiner*—Terry Lee Melius
*Attorney, Agent, or Firm*—Rogers & Scott

[57] ABSTRACT

The invention provides a picker attachment and apparatus having the attachment for picking olives. The picker attachment includes a base and a plurality of longitudinally-extending spindles carried by and extending forwardly therefrom. Each spindle is rotatable about a longitudinal axis. The spindles are caused to rotate in unison by a spindle coupler. Each of the spindles has at least one longitudinally-extending elongate flat portion, each elongate flat portion having a longitudinally-extending edge being a radially peripheral edge of the spindle, the edge defining a longitudinally-extending flange disposed generally perpendicularly to the plane of the planar flat portion, whereby the spindles can receive a transversely-extending olive-bearing branch therebetween and engage and remove olives from the branch while rotating.

20 Claims, 4 Drawing Sheets

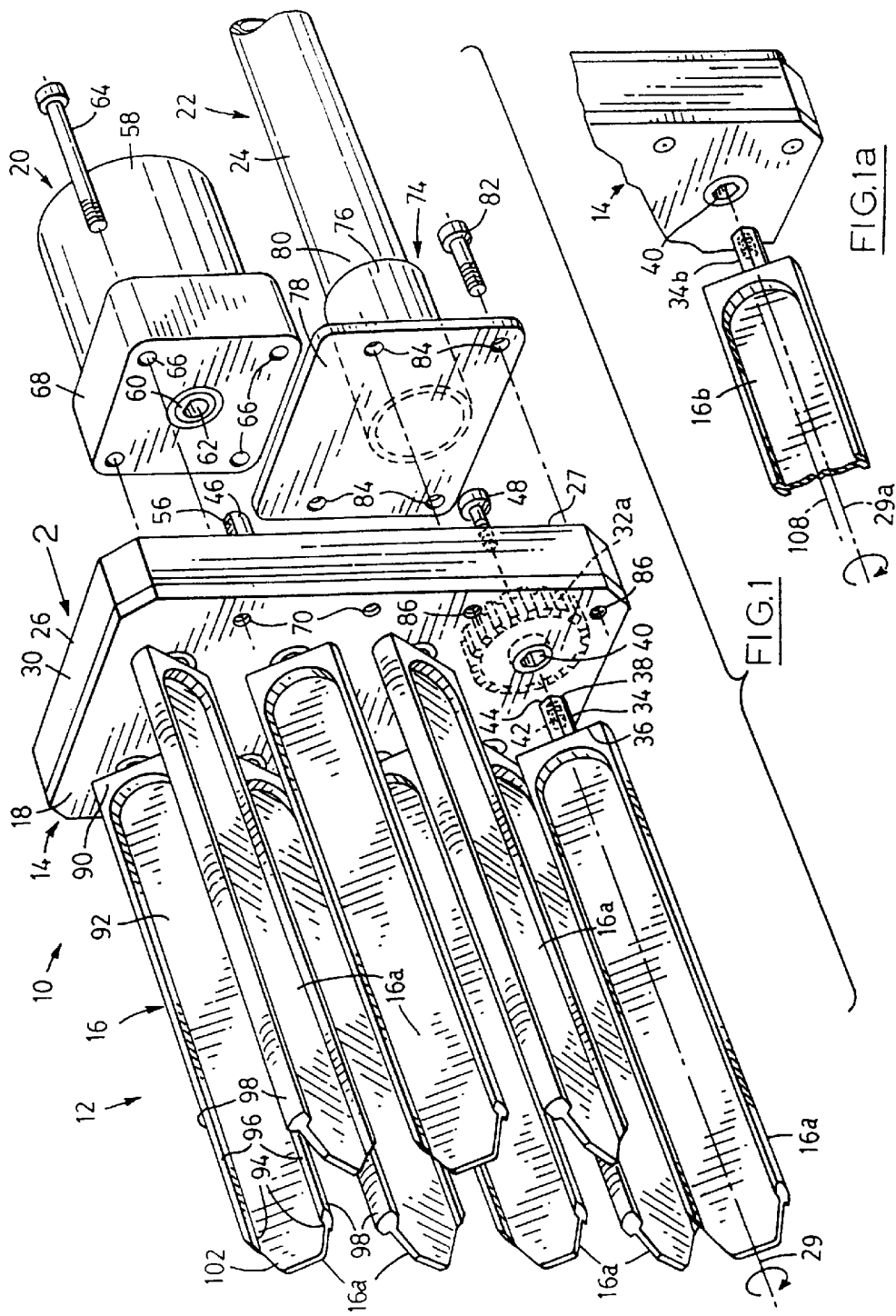

OLIVE PICKER

FIELD OF THE INVENTION

The invention relates to a picker attachment and apparatus having the attachment for picking olives.

BACKGROUND OF THE INVENTION

Numerous types of apparatus for mechanically picking olives are known. Some olive-picking apparatus have rotatable, parallel spindles for insertion among tree branches. While rotating, the spindles pull the olives from the branches thereby causing them to fall to the ground.

There is still however a need for a simple, effective, easy-to-use and non-damaging olive picker and an object of the invention is to meet this need.

SUMMARY OF THE INVENTION

The invention provides a picker attachment and apparatus having the attachment for picking olives.

The picker attachment includes a base and a plurality of longitudinally-extending spindles carried by and extending forwardly therefrom. The spindles are caused to rotate about respective longitudinal axes in unison by a spindle coupler.

Each of the spindles includes at least one longitudinally-extending elongate flat portion, each elongate flat portion having a longitudinally-extending edge being a radially peripheral edge of the spindle, the edge defining a longitudinally-extending flange disposed generally perpendicularly to the elongate flat portion, whereby the spindles can receive a transversely-extending olive-bearing branch therebetween and engage and remove olives from the branch while rotating.

The elongate flat portions may be integrally connected to each other at a central longitudinal axis of the spindle. In the case of spindles having two elongate flat portions, the portions may be coplanar. In the case of spindles having three elongate flat portions, the portions may also be angularly spaced an equal distance from each other.

Each spindle may have an axis of rotation spaced from its central longitudinal axis.

Each flange may also have a longitudinally-extending groove provided centrally on an outer surface thereof.

The spindle coupler may cause any spindle to rotate in a direction opposite to the direction of rotation of a next adjacent spindle. It may also cause the spindles to rotate at the same rate. Further, the coupler may include a plurality of gears operatively coupled to each other such that rotation of any gear causes rotation of the other gears. The gears may be equal in number to the number of spindles and may also be of the same size.

The spindles may be in releasable engagement with the base.

The invention also provides an apparatus for picking olives including picker attachments according to the invention operatively coupled to drive means for rotating the spindles. The apparatus may further include a handle secured to and for manipulating the attachment.

BRIEF DESCRIPTION OF THE DRAWINGS

Embodiments of the invention will now be described, by way of example, with reference to the accompanying drawings, of which FIG. 1 is an exploded isometric partial view of an apparatus including an eight spindle picker attachment in accordance with a first preferred embodiment of the invention, with some parts omitted for clarity, the attachment being coupled to a drive assembly and a handle, the handle having a portion thereof broken away;

FIG. 1a is a partial view similar to the view of FIG. 1, partly broken away, showing an attachment having an "off-centre" spindle;

DETAILED DESCRIPTION OF THE PREFERRED EMBODIMENTS

Figure 3:
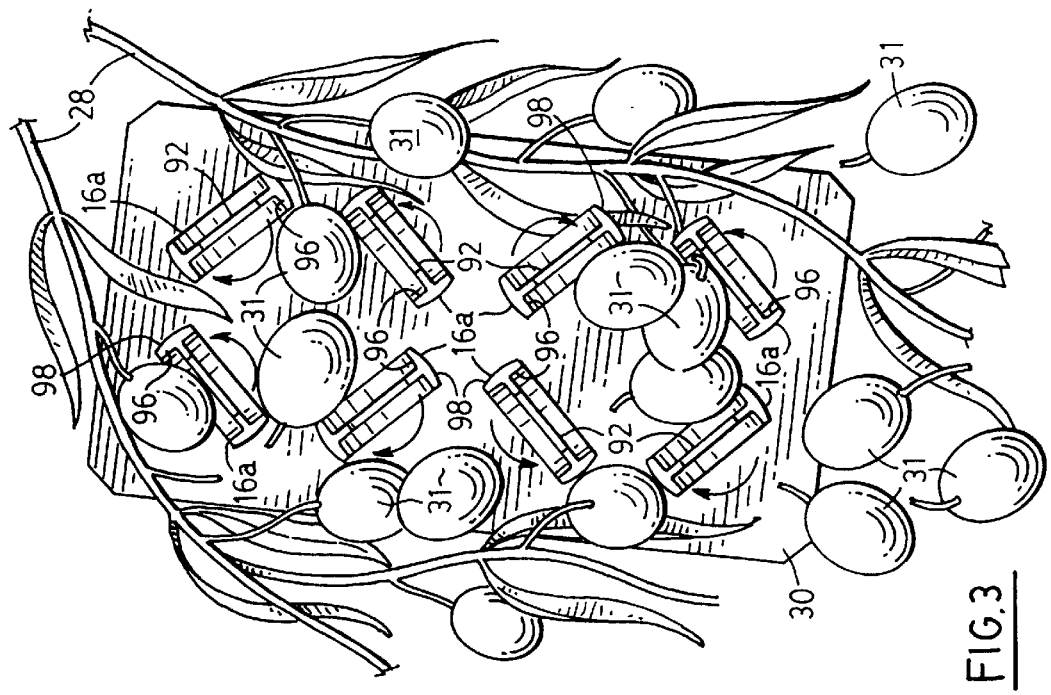
FIG. 3 is a view of the apparatus of FIG. 1, in a direction opposite to the direction of the arrow 2 of FIG. 1, in operative engagement with branches of an olive tree.
Figure 2:
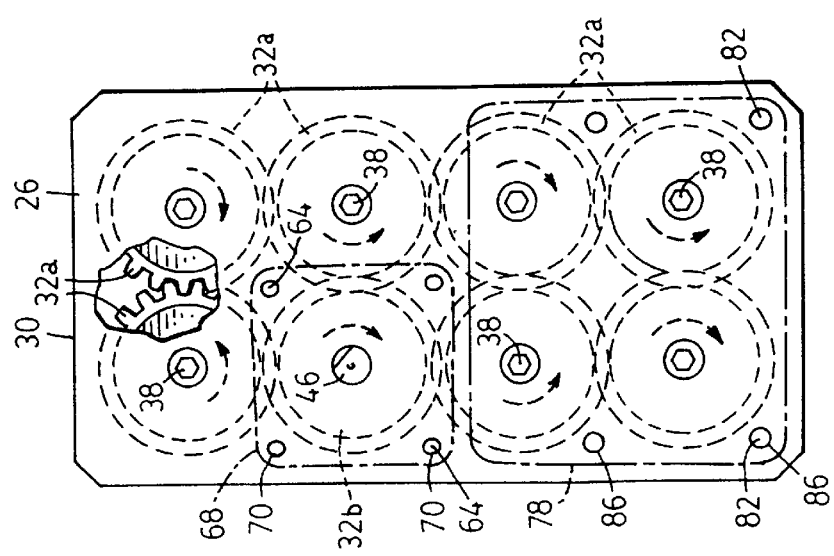
FIG. 2 is a view of the apparatus of FIG. 1 in the direction of the arrow in FIG. 1 denoted by reference numeral 2, with some detail omitted for clarity, partly broken away to show internal structure, and showing the location of attachment of the drive assembly and handle in ghost outline.

With reference mainly to FIG. 1, but with reference also to FIGS. 2 and 3, an apparatus for picking olives indicated generally by reference numeral 10 is shown (in part). The apparatus 10 includes a picker attachment generally indicated by numeral 12 having a base 14. Longitudinally-extending parallel spindles, indicated generally by numeral 16 and individually by numeral 16a, are carried by a forward portion 18 of the base 14 as will be described further. A drive assembly generally indicated by numeral 20, for rotating the spindles 16, and a handle assembly identified generally by numeral 22 including a handle 24 (shown in part), are coupled to a rearward portion 26 (FIG. 2) of the base 14, as will also be described in more detail below.

In use, the apparatus 10 is held by the handle 24 and positioned adjacent olive-bearing branches 28 with the spindles extending in a direction transverse to the direction of the branches (FIG. 3). Actuation of a motor (not shown) in the drive assembly 20 causes the spindles 16 to rotate, in this case, about their respective central longitudinal axes 29. The rotating spindles will engage the olives and pull them off the branches with little or no damage to the olive tree, as can be seen in FIG. 3.

The base 14 of the picker attachment includes a generally rectangular housing 30 containing a gear assembly 32 (FIG. 2). The gear assembly includes eight substantially identical gears 32a arranged in a plane into two even rows of four gears in a row, and having their respective axes of rotation extending longitudinally. Each gear in a row is in rotatable engagement with a next adjacent gear in the other row and with a next adjacent gear in the same row (FIG. 2). Thus, rotation of any gear will cause rotation of any next adjacent engaged gear in a direction opposite to the direction of rotation of the subject gear. Since the gears are operatively linked, rotation of any gear will cause rotation of the other gears in unison. Also, because the gears are of the same size, they will rotate at the same rate.

Each spindle 16a has an integral, co-axial spindle shaft 34 extending longitudinally rearwardly from a rearward end 36 of the spindle. The shaft has a hexagonal transverse cross-section 38 (FIG. 2) and is slidingly received by a hexagonal longitudinally-extending bore 40, provided in the centre of each gear and extending therethrough and through the housing 30 of the base 14. A co-axial, longitudinally-extending screw thread termination 42 is provided in the centre of each shaft 34 and extends through a rearward end 44 thereof. The screw thread terminations 42 of the spindle shafts are for receipt of complementary threaded screws 48 from a rearward side 27 of the base 14, for added reinforcement. Rotation of the gears will cause the shafts to rotate about their axes of rotation 29 in the same direction and at the same rate as the gears due to the hexagonal transverse sections of the complementary shafts 34 and gear bores 40.

FIGS. 1 and 2 show a permanent drive shaft 46 rigidly fixed to and rotatable with a second gear 32*a* in one of the rows of gears, hereinafter to be referred to as the "drive gear" 32*b* (FIG. 2). The drive shaft 46 extends longitudinally rearwardly of the drive gear 32*b* and is of a uniform dimension along its length. The shaft 46 is generally cylindrical except for planar portion 56 which extends parallel to the axis of the shaft.

Co-axial with the axis of rotation of the shaft 46 is a longitudinally-extending bore (not shown) extending through the length of the shaft. The bore permits a small-headed screw (not shown) to be placed therethrough for receipt by the complementary screw thread termination 42 of the corresponding spindle shaft 34. Hence, the attachment of all spindles to the base is reinforced by screws.

The drive shaft 46 is coupled to a motor (not shown) in a housing 58 of the drive assembly 20 via a coupler 60 also included in the housing. The motor is powered by a battery and actuated by a switch (not shown). The coupler 60 includes a complementary longitudinally-extending bore 62 for sliding receipt of the drive shaft 46. When so engaged, the drive shaft is rotatable with the coupler. The housing 58 is secured to the rearward portion 26 of the base 14 by means of four identical threaded bolts 64 extending through four apertures 66 provided in four corners of a generally square base portion 68 of the housing 58. The bolts 64 are received by complementary threaded apertures 70 extending through the base 14 of the attachment. Actuation of the motor causes the coupler 60 to rotate which in turn causes the drive shaft 46 to rotate, thereby causing the gear assembly 32 and consequently the spindles 16 to rotate in unison.

The handle 24 is coupled to the base 14 of the attachment 12 by means of a bracket 74. The bracket has a cylindrical cup-like portion 76, integral with and extending rearwardly from a generally square plate portion 78, for securely receiving a forward end 80 of the handle 24. In similar fashion to the drive assembly housing 58, the bracket 74 is secured to the rearward portion 26 of the base 14, adjacent the drive assembly 20, by means of four identical threaded bolts 82 extending through apertures 84 in the plate portion 78 and received by complementary threaded apertures 86 extending through the base 14. The elongated handle 24 facilitates access of the attachment to branches that are beyond arm's reach and provides the means by which the apparatus may be held and manipulated when in use.

The spindles 16 are of a novel shape and are particularly effective in plucking olives from olive branches when rotating in the afore described manner. Each spindle 16*a* has a longitudinally-extending, elongated body designated generally by numeral 88 including a widened base 90 having a rearward portion integral with the spindle shaft 34. Extending forwardly from the base 90 is an integral, elongate flat main portion 92 having a forward tapered edge 102. The main portion includes two opposed longitudinally-extending parallel edges 94 defining longitudinally-extending flanges 96 disposed generally perpendicularly to the plane of the main portion 92. The flanges 96 have smooth, slightly rounded outer surfaces 98 (FIG. 3).

FIG. 3 shows the spindles engaging an olive branch 28 extending transversely to the spindles 16. In use, the rotating spindles will engage olives 31 therebetween and pull them from the branches with the aid of the rotating spindle flanges 96. In this embodiment, the spindles are arranged such that at one instant during a cycle of rotation the planar main portion 92 of each spindle 16*a* in any row is aligned in the same plane and parallel to another plane in which are aligned main portions 92 of the spindles 16*a* in the other row. Thus, while rotating, adjacent spindles will have flanges 96 moving towards and away from each other at regular intervals and assisting in plucking olives off the branches when the flanges are moving towards each other.

Figure 4:
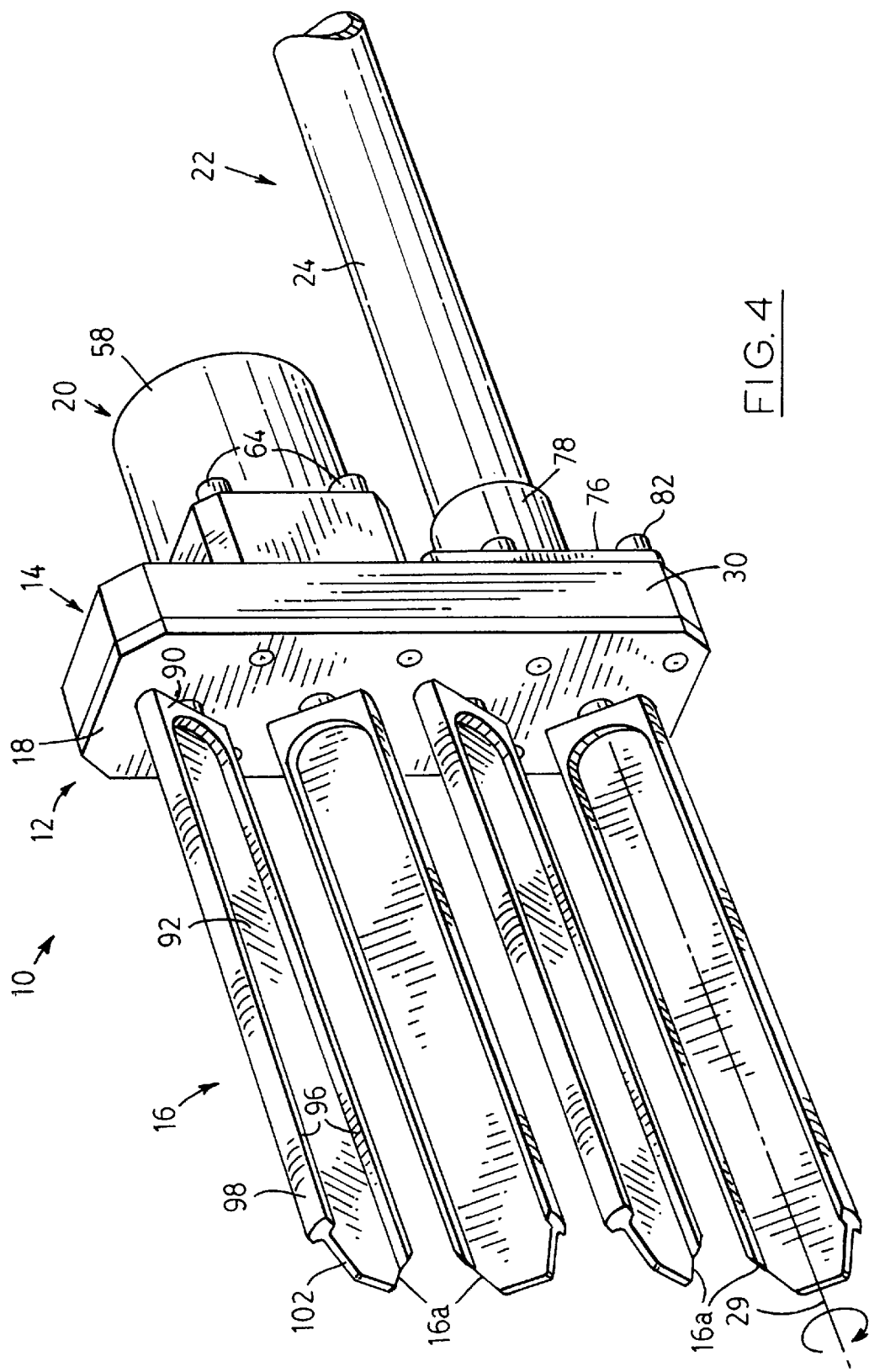
FIG. 4 is an isometric partial view of an apparatus having a four spindle picker attachment in accordance with a second preferred embodiment of the invention.

FIG. 4 shows another embodiment of the invention to be preferred for smaller olive-picking jobs or when a lighter, more easily handled olive-picking apparatus is desired. This embodiment is similar in every respect to the first preferred embodiment except that the attachment includes only one row of four spindles.

FIG. 1*a* illustrates an alternative embodiment of a spindle according to the invention. The spindle 16*b* has an axis of rotation 29*a* spaced from a central longitudinal axis 108 of the shaft by virtue of having an integral "off-centre" spindle shaft 34*b*. An attachment having spindles according to this embodiment would cause branches to shake when the spindles are rotating, thereby causing riper olives to fall to the ground.

Figure 5:
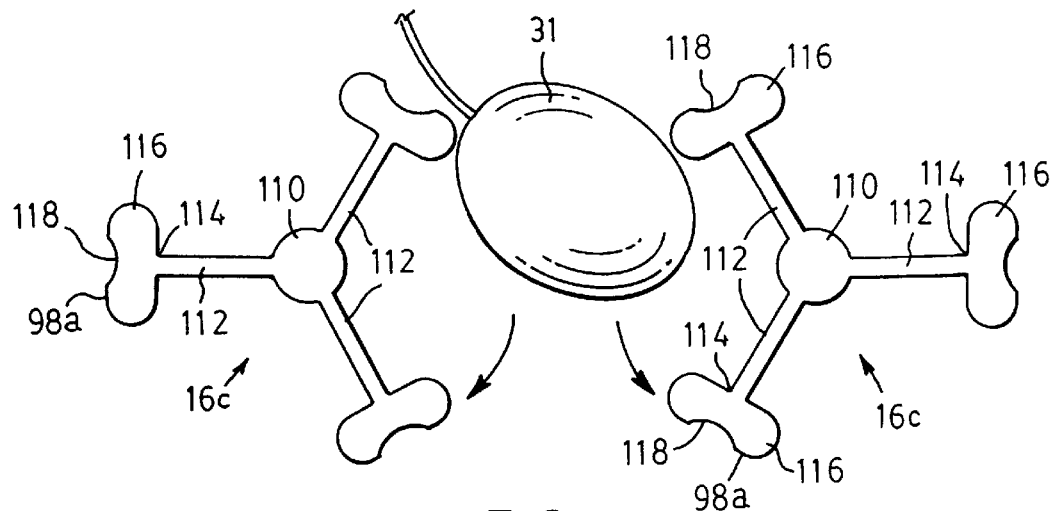
FIG. 5 is a simplified view of "three-pronged" spindles in transverse cross-section in engagement with a large olive.
Figure 6:
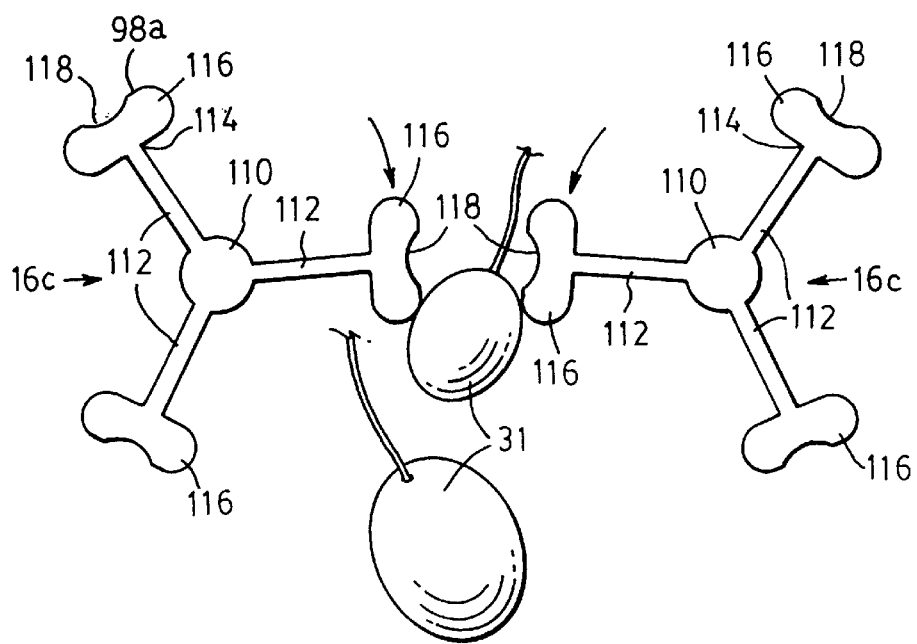
FIG. 6 is a simplified view of "three-pronged" spindles in transverse cross-section in engagement with a small olive.

FIGS. 5 and 6 are simplified views of a third embodiment of spindles according to the invention in transverse cross-section in use. Each spindle 16*c* has a longitudinally-extending cylindrical central portion 110 and three angularly spaced longitudinally-extending elongate flat arms 112 integral with the central portion 110. Each arm 112 has a longitudinally-extending edge being a radially peripheral edge 114 of the spindle 16*c*. Each edge 114 defines a longitudinally-extending flange 116 extending generally perpendicularly to the plane of the corresponding arm. The flanges 116 have outer surfaces 98*a* 98*c* defining a central longitudinally-extending groove 118. As can be seen in FIGS. 5 and 6, portions of the outer surfaces 98*a* are effective in plucking large and small olives 31 from branches as the flanges 116 of adjacent spindles move towards each other.

The invention provides for variations in the attachments and apparatus having the attachments. For instance, the spindles may have any number of radially peripheral longitudinally-extending flanges. It should be appreciated that the invention provides for spindles having at least one longitudinally-extending elongate flat portion. Each elongate flat portion includes a longitudinally-extending edge being a radially peripheral edge of the spindle, and defining a longitudinally-extending flange disposed generally perpendicularly to the plane of the elongate flat portion. As well, a spindle similar to that of FIG. 1, but which is bent along its longitudinal axis giving rise to two integral elongate flat portions that do not lie in the same plane is also within the scope of the invention. Furthermore, there may be four or more, longitudinally-extending elongate flat portions integrally connected at a respective longitudinally-extending edge thereof and having opposite edges being radially peripheral edges of the spindle and defining flanges as aforedescribed.

The spindles may vary in number, be spaced at varying distances apart, and be of varying lengths and widths as would allow olives to be plucked efficiently and easily. In practice, the width of each spindle should not exceed 1½" for maximized picking efficiency.

Also as the number of radially-peripheral flanges increase, the rate of rotation should decrease to maintain optimized picking conditions.

While it is desirable that any spindle rotate at the same rate as any other spindle of the attachment, this need not be the case. Further, where the spindles are rotating at the same rate, the rate of rotation may vary depending on the motor drive rate.

The spindles may be more easily removable and replaceable with other embodiments of spindles described and claimed. For example, the spindles may be secured to the attachment base without screws for reinforcement.

The handle can be of any length or shape permitting adequate handling and manipulation of the apparatus when in use.

The foregoing description is by way of example only and is not meant to limit the scope of the invention as defined by the following claims.

I claim:

1. A picker attachment for picking olives including:
   (a) a base;
   (b) a plurality of longitudinally-extending spindles carried by and extending forwardly from the base, each spindle being rotatable about a longitudinal axis; and
   (c) spindle coupling means for causing all the spindles to rotate in unison:
      each of said spindles having at least one longitudinally-extending elongate flat portion, each elongate flat portion having a longitudinally-extending edge, said edge being a radially peripheral edge of the spindle and defining a longitudinally-extending flange disposed generally perpendicularly to the elongate flat portion,
      whereby the spindles can receive a transversely-extending olive-bearing branch therebetween and engage and remove olives from the branch while rotating.

2. An attachment according to claim 1 wherein said longitudinally-extending axis is spaced from a central longitudinally-extending axis of the spindle.

3. An attachment according to claim 1 wherein each flange has an outer surface defining a longitudinally-extending groove disposed generally centrally of said outer surface.

4. An attachment according to claim 1 wherein said spindles are in releasable engagement with the base.

5. An attachment according to claim 1 wherein each spindle includes two of said longitudinally-extending elongate flat portions integrally connected at a central longitudinal axis of the spindle.

6. An attachment according to claim 5 wherein said two elongate flat portions in each spindle are co-planar.

7. An attachment according to claim 6 wherein each flange has an outer surface defining a longitudinally-extending groove disposed generally centrally of said outer surface.

8. An attachment according to claim 7 wherein said longitudinally-extending axis of each spindle is spaced from a central longitudinally-extending axis of the spindle.

9. An attachment according to claim 1 wherein each spindle includes three of said longitudinally-extending elongate flat portions integrally connected at a central longitudinal axis of the spindle.

10. An attachment according to claim 9 wherein said three elongate flat portions are equidistantly angularly spaced from each other.

11. An attachment according to claim 1 wherein the spindle coupling means causes any spindle to rotate in a direction opposite to the direction of rotation of a next adjacent spindle.

12. An attachment according to claim 11 wherein the spindle coupling means causes the spindles to rotate at the same rate.

13. An attachment according to claim 12 wherein the spindle coupling means includes a plurality of gears, each spindle being coupled to and rotatable with a respective gear, said gears being operatively coupled such that rotation of any gear causes the rotation of the other gears.

14. An attachment according to claim 13 wherein the number of gears is equal to the number of spindles and the gears are of the same size.

15. Apparatus for picking olives including:
   (a) a picker attachment according to claim 1;
   (b) drive means operatively coupled to the attachment for rotating the spindles; and
   (c) a handle secured to the base.

16. Apparatus for picking olives including:
   (a) a picker attachment according to claim 9;
   (b) drive means operatively coupled to the attachment for driving the rotation of the spindles; and
   (c) a handle secured to the base.

17. A spindle for use in an apparatus for picking olives, the spindle including at least one longitudinally-extending elongate flat portion, each elongate flat portion having a longitudinally-extending edge, said edge being a radially peripheral edge of the spindle and defining a longitudinally-extending flange disposed generally perpendicular to the elongate flat portion.

18. A spindle according to claim 17 including two of said longitudinally-extending elongate flat portions integrally connected at a central longitudinal axis of the spindle.

19. A spindle according to claim 18, wherein said elongate flat portions are co-planar.

20. A spindle according to claim 19 wherein each flange has an outer surface defining a longitudinally-extending groove disposed generally centrally of said outer surface.

* * * * *